Oct. 3, 1961 — A. H. JOBERT — 3,002,258
CHUCK-ACTUATING MEANS
Filed June 18, 1954 — 2 Sheets-Sheet 1

INVENTOR
ARTHUR H. JOBERT
BY
ATTORNEYS

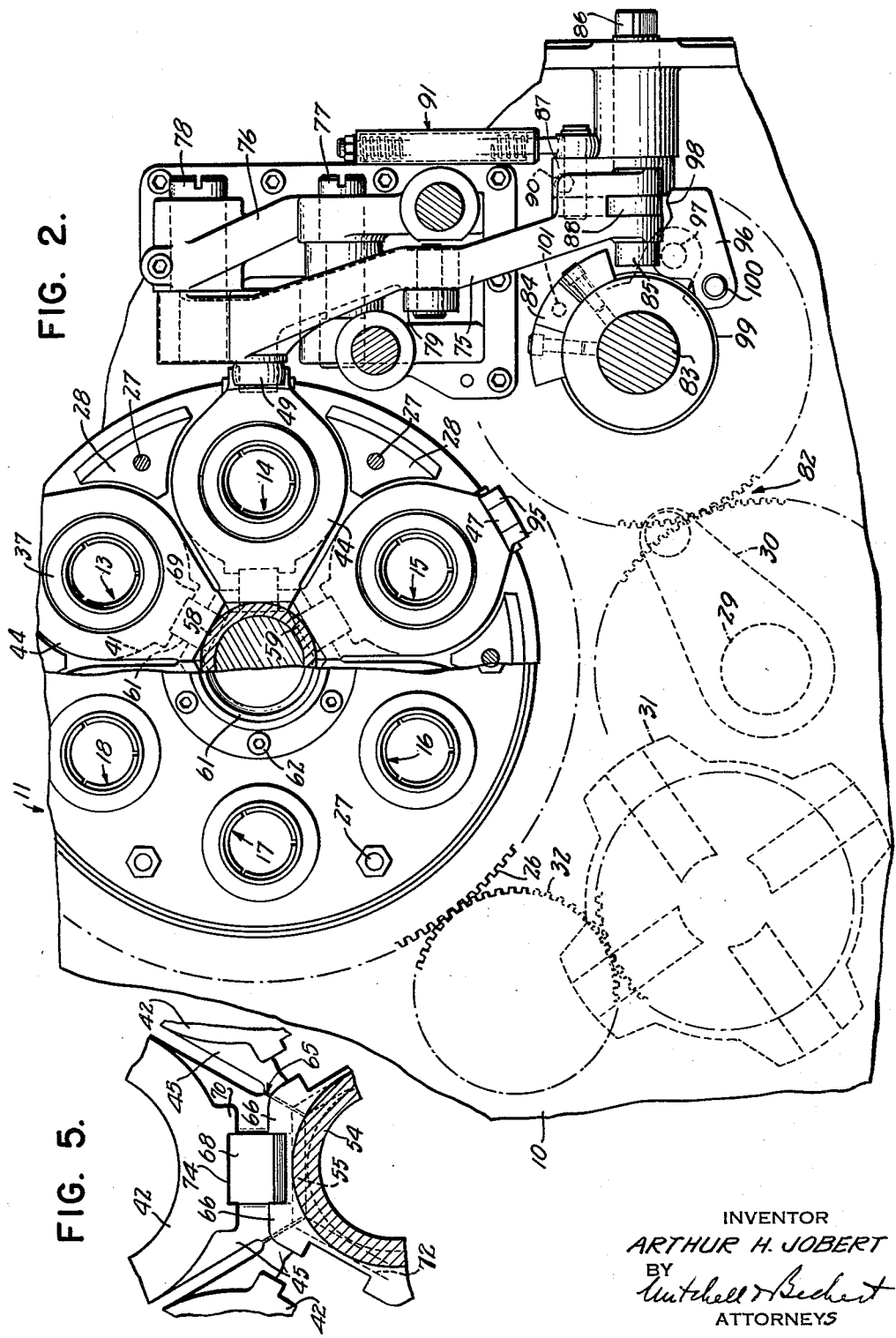

3,002,258
CHUCK-ACTUATING MEANS
Arthur H. Jobert, New Britain, Conn., assignor to The New Britain Machine Company, New Britain, Conn., a corporation of Connecticut
Filed June 18, 1954, Ser. No. 437,752
21 Claims. (Cl. 29—37)

My invention relates to automatic multiple-spindle machines and, in particular, to improved chucking means for selectively actuating the chuck for a particular spindle to the exclusion of the chuck for another spindle, all in accordance with the indexing cycle of the spindle carrier.

It is an object of the invention to provide improved means of the character indicated.

It is another object to provide more compact chuck-actuating means in a machine of the character indicated.

It is also an object to provide improved chuck-actuating means inherently lending itself to the uniform chucking of stock, regardless of fluctuations in stock diameter.

It is a further object to provide a chuck-actuating mechanism for a machine of the character indicated and characterized by absence of force reaction on the spindle carrier or on the spindle as a result of chuck operation.

It is a still further object to provide manual and/or automatic operation of the chuck-actuating means, with the safety feature of releasing the manually-operated mechanism automatically in order to set a chuck, should the manually-operated means have been left in the chuck-open position at the time when the machine is re-engaged for automatic operation.

Other objects and various further features of novelty and invention will be pointed out or will occur to those skilled in the art from a reading of the following specification in conjunction with the accompanying drawings. In said drawings, which show, for illustrative purposes only, a preferred form of the invetnion:

FIG. 2 is a left-end view of the structure of FIG. 1, with parts of the end of the spindle carrier broken away to reveal certain elements in section, as viewed substantially in the plane 2—2 of FIG. 1;

FIG. 5 is an enlarged fragmentary view in section, as viewed generally from the plane 5—5 of FIG. 1.

Figure 1:
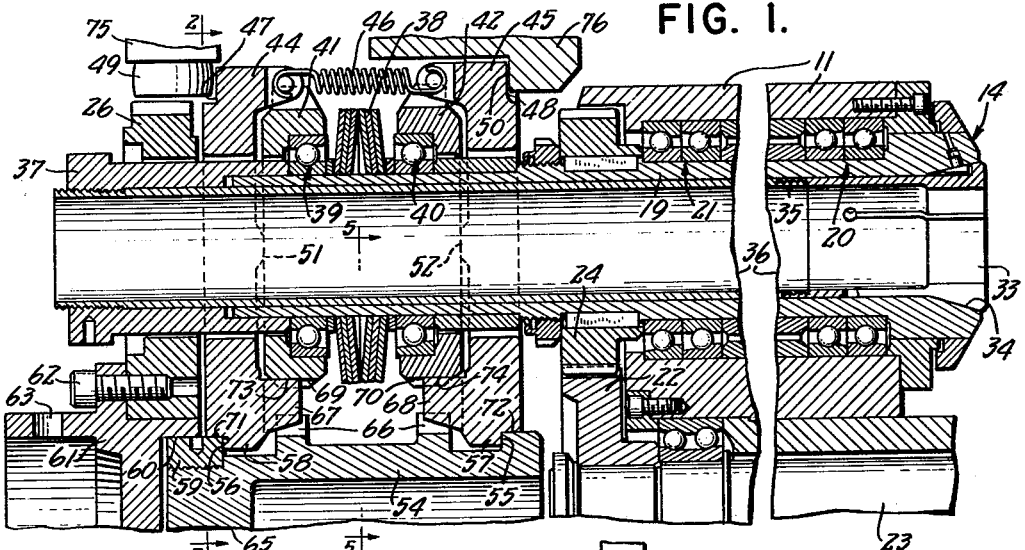
FIG. 1 is a fragmentary longitudinal sectional view of a spindle carrier and spindle to which chucking means of the invention has been applied.

Briefly stated, my invention contemplates the application of preloaded spring means to the chucking mechanism or collet for each of a plurality of spindles in the spindle carrier of a machine of the character indicated. The spring means may comprise opposed Belleville washers, so that chucking force may be substantially uniform for a relatively extensive range of fluctuations in stock diameter. Opposed thrust yokes carried by the spindle carrier at each spindle location may be floatingly related to each other and in load-deflecting relation with the spring means so that, upon compression of the yokes together, the spring will be deflected, and the chuck grip effectively released, as at the loading station of the spindle carrier. Each of the yokes may include outwardly projecting means, to be aligned with external actuating means at each indexed position of a spindle carrier. The external actuating means may comprise a differential linkage whereby no net reaction on the frame or on the spindle or spindle carrier is occasioned by reason of spring deflection, with accompanying relief of chuck grip. Provision is made for automatic or manual actuation of my differential actuating means, and automatically operated means functioning in timed relation with the indexing operation quickly relieve a manually set chuck condition should the operator, through inadvertence, fail to close the chuck after having performed a manual operation.

Referring to the drawings, my invention is shown in application to a machine comprising a frame 10 supporting a spindle carrier 11 for indexing movement about a central axis. A plurality of spindles 13—14—15—16—17—18 may be mounted at angularly spaced locations on the spindle carrier 11. Each spindle may comprise essentially a spindle tube 19 supported in spaced sets of bearings 20—21 and driven by a central drive gear 22 connected to the works (not shown) by a shaft 23 and meshing simultaneously with spindle-drive gears 24 for each of the spindles 13 . . . 18.

The rear end of the spindle carrier may be defined by an index gear 26 rigidly tied to the spindle carrier by means of elongated bolts 27 and positioned by spacers 28 located between spindle positions. Drive to the index gear 26 may be imparted by mechanism connected to the main camshaft 28 of the machine and is shown to include a Geneva arm 30 and a Geneva wheel 31; an idler gear 32 directly imparts Geneva-wheel motion to the index gear 26.

Depending upon the intended use of the machine, each spindle may be equipped with a collet or with a chuck. In the form shown, collets 33 are used, of the hollow or internally fed variety, comprising wedge-shaped jaws cooperating with an outwardly flared mouth 34 of the spindle tube 19 to produce stock-gripping action upon relative longitudinal displacement of the collet 33 with respect to the spindle tube 19. The collet 33 is shown connected by threaded means 35 to a collet tube 36 extending rearwardly of the spindle carrier and of the spindle tube 19, and an adjustment nut 37 is externally accessible at the rear end of the assembly and is rotatably carried by the rear end of the collet tube 36.

In accordance with the invention, the collet or chuck 33 is actuated by preloaded spring means biased to drive the chuck jaws in a chucking direction. For the arrangement shown in FIG. 1, the spring bias thus urges the collet tube 36 to the left and the spindle tube 19 to the right. Spring means may comprise so-called Belleville washers 38 and, in the form shown, opposed sets of three washers are slidably carried on a reduced diameter of the spindle tube at a location intermediate the index gear 26 and the main frame of the spindle carrier. For actuating purposes, thrust bearings 39—40 are also slidably carried on this reduced part of the spindle tube and on opposite sides of the spring means 38. The thrust bearings are preferably of the antifriction variety comprising inner and outer rings with interposed antifriction elements, and the inner rings may directly ride the spindle tube 19. In order to actuate the thrust bearings, it is convenient to employ separate thrust rings 41—42 having bores in which the outer race rings for the respective bearings 39—40 are received. Similar opposed thrust yokes 44—45 loosely embrace the spindle on opposite sides of the described spring-and-thrust assembly, and further spring means 46 serves to retain the thrust yokes against looseness while unactuated. Each of the thrust yokes is provided with an externally accessible projecting surface 47—48, as the case may be, poised to be intercepted between the respective actuators 49—50 of a frame-based differential-actuation means to be described.

Differentially derived thrust forces are applied to the respective thrust rings 41—42 through diametrically spaced projections provided in duplicate at 51 for the yoke 44, and in duplicate at 52 for the yoke 45. These propections 51 and 52 are preferably equally spaced radially with respect to the indexing axis. Reaction for application of thrust at locations 51—52 is derived from a central floating member 54 providing spaced shoulders 55—56 serving as abutments for fulcrum lugs 57—58 at the radially inner limits of the yokes 44—45. In order to facilitate assembly, the abutment 56 at one end of the floating member 54 is on a nut 59 removably secured to the body of the member 54. Floating action is guided and centrally located by the axially slidable action of nut 59 in the bore 60 of a bushing member 61 bolted at 62 to the index gear 26 and having, if desired, rearwardly projecting means 63 for connection to a suitable stock reel, as is well known in the art.

I prefer that the yokes 44—45 and thrust rings 41—42 shall be held against rotation, and this may be achieved by provision of close clearance 65 between adjacent radially inner parts of the thrust yokes, as shown in FIG. 5 for yokes 45; adjacent yokes 44 and adjacent yokes 45 are thus self-retaining against rotation. Similarly, key lugs 66 on the floating member 54 coact with lugs 67—68 on yokes 44—45 and, in turn, lugs 67—68 coact with further locating lugs 69—70 on thrust rings 41—42. Positive radial location of the yokes 44—45 is achieved by having inwardly facing parts 71—72 of the respective yokes ride floating member 54 as on suitably formed flats, and a similar engagement characterizes the fit at 73 of yoke 44 to ring 41 and at 74 of yoke 45 to ring 42. The surfaces 74 of the yoke 45, coacting with the surfaces 70 of the thrust rings 42, and the close clearance 65 between the adjacent yokes serve to maintain all the yokes 45 in closely nested relation so that the parts or surfaces 72 of the yokes form a polygon which supports the circular inner or right end of the sleeve 54.

Figure 3:
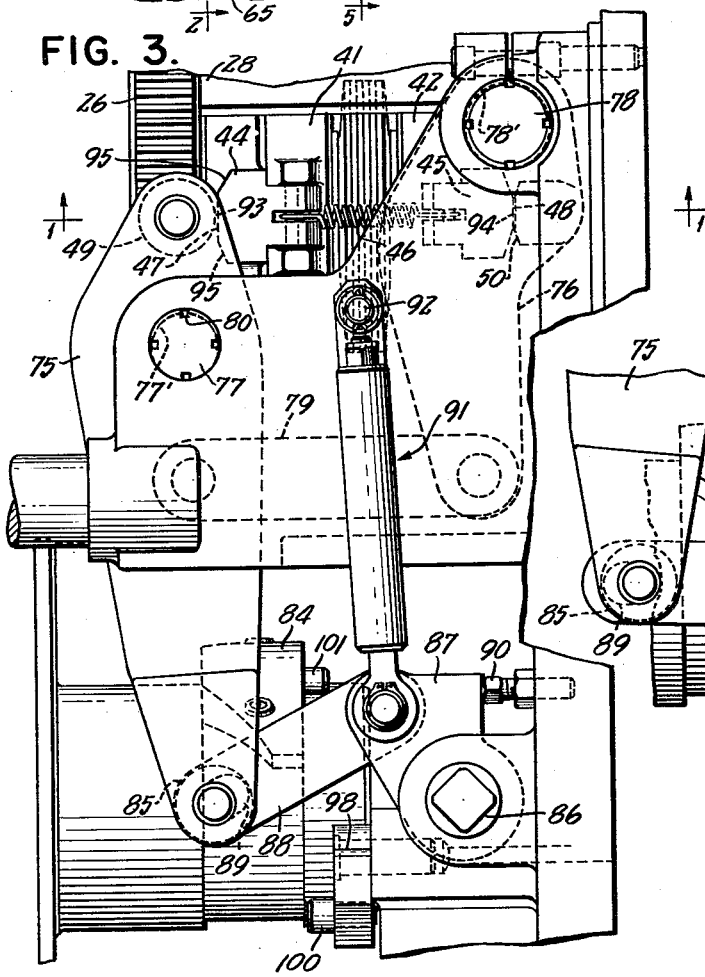
FIG. 3 is a fragmentary right-end elevation of certain actuating parts shown in FIG. 2.

The external actuating mechanism terminates in thrust roll 49 and in the thrust abutment 50. This mechanism may comprise a system of levers 75—76 pivoted to the frame at locations 77—78 and interconnected by link means 79 in such manner that actuation of one of the levers will be accompanied by opposite actuation of the other lever. By referring to FIG. 3, it will be seen that the levers 75—76 are so connected to each other by link 79 that the thrust applicator 50 of lever 76 will move only a short distance but sufficient to move the inner member of the spindle bearing 40 away from its coacting thrust spacer, while the thrust applicator 49 of the lever 75 moves a substantially greater distance, thus providing sufficient axial movement of the collet-tube assembly to unchuck the bar stock. Initial movement of lever 75 will absorb the clearance between the thrust applicators 49—50 and their coacting surfaces 93—94 of the levers after which the thrust sleeve 54 will float until the thrust load between the thrust applicators is balanced, thus trapping the load of the Belleville washers between the thrust rings 41—42 to completely remove and load from the spindle 19 and bearings 20—21 in either direction.

For adjustment purposes, it is convenient to form the pivots 77—78 with eccentric bearing means, as suggested by the dotted outlines 77' and 78' and with externally accessible means, such as spanner holes or notches 80 to provide for slight eccentric adjustment in the pivot placement for the respective levers 75—76. In the automatic operation of the machine, one of the levers 75—76 will be actuated in timed relation with the indexing cycle of the machine, and this motion will be derived from the main camshaft 29, as by a 1:1 gear connection 82 to an auxiliary camshaft 83 (FIG. 2) carrying a chucking cam 84. A follower roll 85 carried by the lever 75 may be poised for actuation by the chucking cam 84, as will be understood.

In accordance with a feature of the invention, I provide, in addition to the automatic differential actuation of successive chucks in the spindle carrier, provision for manual actuation of whatever chuck happens to be at the chucking station. Manual operation may involve wrench or crank actuation of an externally projecting squared shaft 86 in driving relation with toggle mechanism, including a crank 87, connected to lever 75 through link 88 and lost-motion means 89. A limit stop 90 may determine one limiting position of the manually-operated crank 87, and spring means 91 based at 92 on the frame of the machine may constantly urge the toggle mechanism to the position shown in FIG. 3. The adjustment at 90 (as well as at eccentric pivots 77—78) is preferably such that a slight axial clearance occurs at 93 between the thrust roll 49 and the surface 47 of yoke 44, and so that at the same time a slight clearance exists at 94 between the thrust applicator 50 and the surface 48 of yoke 45. These clearances may assure indexing without contact of the yokes 44—45 with the differential-actuating mechanism, but, for positive assurance that the parts will not be fouled, I prefer that cam slopes be formed on opposite sides of the parts to be engaged as, for example, at slope 95 adjacent flat 47 on yoke 44.

Figure 4:
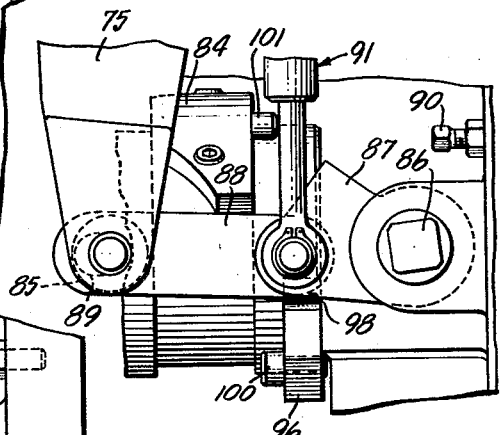
FIG. 4 is a view similar to FIG. 3, but showing the parts in a different relation.

In accordance with a further feature of the invention, I provide for automatic relief of the manually operated toggle should the machine be started in automatic operation when the manual means has been set to leave the chuck open, as illustrated by the case of FIG. 4. The relieving mechanism may comprise a rocker 96 pivoted at 97 to the frame and having one end 98 poised beneath the central part of the toggle mechanism, when in the set position illustrated in FIG. 4, said end 98 serving to limit toggle movement when set past dead center. The other end of the rocker 96 may ride a cylindrical part 99 of the cam or camshaft 83, and pin means 100 carried by the rocker 96 may normally be in intercepting relation with further pin means 101 carried by cam 84. It will be appreciated that if the machine is engaged for automatic operation with the toggle in the set position of FIG. 4, meaning that the chuck has been left open, the camshaft 83 will immediately be driven so as to cause pin 101 to trip rocker 96 and thus to release the toggle. Thereafter, spring 91 will hold the toggle resiliently in the chuck-closed position represented by FIG. 3. The slotted or lost-motion means 89 in the connection of link 88 to lever 75 assures complete freedom for automatic operation of lever 75 without risking an inadvertent locking of the toggle; thus, the only way to set or lock the toggle is by way of the manually operated means 86.

It will be seen that I have provided improved chucking or collet means for a multiple-spindle machine. The use of Belleville springs permits axial compactness and at the same time provides uniform stock-grip action for a relatively wide fluctuation of stock diameter. Chuck-actuation is achieved by simple mechanism, whether on an automatic or on a selectively manual basis, and differential actuation assures that there will be no net force reaction on the spindle or spindle carrier as a result of chuck actuation. The arrangement is such that all parts requiring adjustment, as for accommodating various stock diameters and chuck loadings, may be reached and manipulated with ease. In fact, access to remove the chuck-loading parts themselves is extremely easy upon releasing the bolts 27, which anchor the index gear 27 to the spindle carrier. The manual-actuating means and the automatic release for that mechanism are also provided with relatively simple adjustment means, and there is provision that, when the machine is started in automatic operation, all spindles will be chucked.

While I have described the invention in detail for the preferred form shown, it will be understood that modifications may be made within the scope of the invention as defined in the claims which follow.

I claim:

1. In a machine of the character indicated, a spindle carrier indexible about an indexing axis, a plurality of spindles revolubly carried by said spindle carrier at angularly spaced locations, independent chucking means for each spindle, spring means carried by each spindle and preloading the chucking means in the direction to grip a piece of stock, thrust-bearing means independently carried by each spindle on opposite longitudinal sides of said spring means, means carried by said spindle carrier at each spindle location and projecting to externally accessible locations for separately actuating said thrust-bearing means to individually deflect said spring means for a particular spindle, and differential-actuating means external to said spindle carrier and including longitudinally spaced longitudinally acting thrust applicators positioned for longitudinal alignment with said externally projecting parts of said thrust-bearing means for successive indexed positions of said spindle carrier, whereby chucking means for one of said spindles may be actuated to the exclusion of the chucking means for another spindle without creating any net reaction on any part of the spindle carrier.

2. In a machine of the character indicated, a spindle carrier indexible about an indexing axis, a plurality of spindles revolubly carried by said spindle carrier at angularly spaced locations, a collet for each spindle and including two axially relatively slidable tubular members for producing collet action, opposed frusto-conical spring washers carried by each spindle and urging said tubular members in the direction to produce collet action, separate thrust bearings slidably carried by each spindle on opposite sides of said spring washers, means projecting externally of said spindle carrier for each of said thrust bearings for receiving actuating forces to compress said spring washers through said bearings and thus to relieve collet action, said externally projecting means comprising, for the case of one thrust bearing a first generally radially extending thrust surface, and, for the other thrust bearing, a similar but opposed generally radially extending thrust surface, said first and said opposed surfaces for all said spindles being substantially in first and second axially spaced, generally radial planes, whereby, depending upon the indexed position of said spindle carrier, one of said collets may be operated to the exclusion of the other by differential actuation means intercepted between said first and opposed surfaces for any particular spindle location.

3. In combination, a frame, a spindle carrier supported for rotation in said frame about an indexing axis, a plurality of spindles revolubly carried by said spindle carrier at angularly spaced locations, a collet for each of said spindles, axially compressed spring means carried by each said spindle and biasing said collet of each spindle in the chucking direction, a pair of externally projecting actuating means carried by said spindle carrier and associated with each spindle for relieving both axial ends of said spring means, said projecting means comprising axially shiftable members on opposite sides of said spring, and frame-based differential actuating means comprising axially spaced thrusting elements aligned with a different pair of said projecting elements for each indexed position of said spindle carrier.

4. In combination, a frame, a spindle carrier indexible in said frame, a plurality of spindles revolubly carried by said spindle carrier at angularly spaced locations, a collet for each spindle, preloaded Belleville springs carried by each spindle and proloaded to urge the spindle collet in the chucking direction, opposed antifriction thrust bearings on opposite longitudinal sides of the Belleville spring, separate pairs of opposed thrust yokes carried by said spindle carrier for each spindle and in thrusting relation with said thrust bearings, outwardly projecting actuating surfaces on said thrust yokes, and frame-based differential-actuating means including longitudinally spaced thrust applicators poised to intercept corresponding pairs of projecting thrust surfaces on said yokes for successive indexed positions of said spindle carrier.

5. The combination according to claim 4, in which an externally accesible longitudinally adjustable member connects the collet and spindle parts to said spring, whereby the normal action of said spring may be selectively adjusted.

6. The combination of claim 4, and including spring means connecting the individual yokes of each said pair, whereby looseness in the support of said yokes at working stations of said spindle carrier may be avoided.

7. In combination, a frame, a spindle carrier indexible on an indexing axis in said frame, a plurality of spindles revolubly supported on said spindle carrier at angularly spaced locations, a collet for each spindle, each spindle including spring means preloaded to urge said collet in a chucking direction, means carried by said spindle carrier and including at each spindle axially spaced thrust yokes on opposite sides of said spring for relieving said spring and therefore releasing chuck grip upon compressing said yokes together, a central fulcrum-reference member carried by said spindle carrier and comprising shoulder means providing fulcruming support for each of said spaced yokes, and means projecting externally of said yokes for cooperation with an external actuating means to differentially displace said yokes and thus deflect said spring means.

8. The combination of claim 7, in which said fulcrum-reference member is longitudinally freely slidably carried by said spindle carrier, whereby reaction against said spindle carrier or against any particular spindle is avoided upon actuating a collet through differential means.

9. The combination according to claim 7, in which corresponding adjacent parts of adjacent corresponding yokes in adjacent spindles are in angularly interfering relation, whereby said yokes are self-supporting in their resistance to rotation with spindle rotation.

10. In combination, a frame, a spindle carrier indexibly supported on said frame, a plurality of spindles revolubly carried by said spindle carrier at angularly spaced locations about the indexing axis, collet means for each spindle, axially compressed spring-loading means carried by each spindle for preloading the collet thereof in a chucking direction, separate pairs of axially spaced externally projecting actuating members carried by said spindle carrier for each spindle location and in deflecting relation with said spring on opposite sides of said spring, and frame-based differential-actuating means in intercepting relation with successive pairs of said externally projecting members for successive indexed positions of said spindle carrier, said differential-actuating means comprising differentially actuated levers operated in timed relation with an indexing of said spindle carrier.

11. In combination, a frame, a spindle carrier indexibly supported on said frame, a plurality of spindles revolubly carried by said spindle carrier at angularly spaced locations about the indexing axis, collet means for each spindle, axially compressed spring-loading means carried by each spindle for preloading the collet thereof in a chucking direction, a separate pair of spaced actuating members carried by said spindle carrier for each spindle location and in deflecting relation with said spring on opposite sides of said spring, each said actuating member including a projection extending radially of said spindle carrier, a single axially floating fulcrum means carried centrally of said spindle carrier and providing fulcrum reference for all said actuating members, and two frame-based lever mechanisms carrying thrust applicators at spaced locations corresponding to the spacing of the projections of each said pair and poised to intercept successive pairs of said projections for each indexed position of said spindle carrier, link means connecting said lever mechanisms so that actuation of one produces an opposite actuation of the other, and means operating in timed relation with an indexing of said spindle carrier for actuating one of said levers.

12. The combination of claim 11, and including manually operable means functioning in conjunction with one of said levers for actuating the same independently of said last-defined means.

13. The combination of claim 11, in which said manually operable means includes a toggle mechanism comprising a frame-based crank, and a link connecting said crank to one of said levers; said crank being actuable, from one extreme position substantially removed from the dead-center position involving the crank axis and the connection of said crank to said link and the connection of said link to said lever, to another position on the opposite side of dead center.

14. The combination of claim 13, and including spring means biasing said toggle mechanism for retention of one position thereof.

15. The combination of claim 13, and including automatic toggle-release means responsive to movement of said means operating in timed relation with an indexing cycle of said spindle carrier for actuating said toggle mechanism from one position thereof to another.

16. In combination, a frame, a spindle carrier indexibly supported on said frame, a plurality of spindles revolubly carried by said spindle carrier at angularly spaced locations about the indexing axis, collet means for each spindle, axially compressed spring-loading means carried by each spindle for preloading the collet in a chucking direction, a separate pair of spaced actuating members carried by the spindle carrier for each spindle location and in spring-relieving relation with said spring on opposite sides of said spring, each said actuating member including a projection extending radially of said spindle carrier, axially floating fulcrum means carried centrally of said spindle carrier and providing fulcrum reference for all said actuating members, and frame-based differential-actuting means including opposed thrust applicators spaced in accordance with the spacing of said projecting members and located to intercept therebetween opposed projecting elements for the spindle currently at the chucking position of said spindle carrier, means operating in timed relation with an indexing cycle of said spindle carrier for actuating said thrust applicators, and manual means including a toggle mechanism for actuating said differential mechanism independently of said last-defined means.

17. In combination, a frame, a spindle carrier indexible in said frame, a plurality of spindles revolubly carried by said spindle carrier at angularly spaced locations, a collet for each spindle, spring means carried by each spindle and preloaded to urge the spindle collet in the chucking direction, opposed thrust-bearing means carried by each spindle on opposite longitudinal sides of said spring means, a separate pair of opposed thrust yokes embracing each spindle and in thrusting relation with the respective thrust-bearing means for each spindle, a radially inwardly projecting fulcrum abutment on each yoke, an axially floating sleeve centrally supported on said spindle carrier and including axially spaced reference abutments for the respective fulcrum abutment of each yoke, angularly adjacent yokes having closely adjacent radially directed flats, whereby each plurality of corresponding yokes for all spindles is angularly located inherently against rotation about a spindle axis, outwardly projecting actuating surfaces on said thrust yokes, and frame-based differential-actuating means including longitudinally spaced thrust applicators poised to intercept corresponding pairs of projecting thrust surfaces on said yokes for successive indexed positions of said spindle carrier.

18. The combination of claim 17, in which each yoke and the corresponding adjacent thrust-bearing means have cooperating flats at substantially equal radial offsets from the spindle carrier axis and tangentially oriented with respect thereto, whereby said cooperating offset flats for each set of yokes define substantially a regular polygon.

19. A machine tool spindle including a revolubly mounted chuck and actuating means therefor, said actuating means including compressed spring means preloading said chuck in the direction to grip a piece of stock, separate thrust-bearing means on the axis of said spindle and reacting oppositely on opposite longitudinal sides of said spring means, and differential-actuating means external to said spindle and including longitudinally spaced thrust applicators positioned for longitudinal alignment with said thrust-bearing means, and means for simultaneously actuating said applicators toward each other and against said respective thrust-bearing means, whereby said chuck may be actuated to open position by differential squeezing displacement of the applicators of said differential-actuating means.

20. In combination, a frame, a spindle carrier indexible in said frame, a plurality of spindles revolubly carried by said spindle carrier at angularly spaced locations about the indexing axis, a collet for each spindle, spring means comprising oppositely dished frusto-conical spring washers carried by each spindle and preloaded to urge the spindle collet in the chucking direction, separate opposed thrust-bearing means carried by each spindle on opposite longitudinal sides of said spring means, a separate pair of opposed thrust yokes embracing each spindle and in thrusting relation with the respective thrust-bearing means for each spindle, a radially inwardly extending projection including a fulcrum abutment on each yoke, corresponding of said projections for each of said spindles being in loosely nested self-locating relation about the spindle-carrier axis within the circle on which the spindle centers are located, an axially floating sleeve centrally supported on said spindle carrier and including axially spaced reference abutments for the respective fulcrum abutments of said yokes, outwardly projecting actuating surfaces on said thrust yokes, and frame-based differential-actuating means including longitudinally spaced thrust applicators poised to intercept corresponding pairs of projecting thrust surfaces on said yokes for successive indexed positions of said spindle carrier, said last-defined means including means for simultaneously actuating said applicators toward each other and against said respective thrust-bearing means.

21. In a machine of the character indicated, a frame, a spindle carrier indexible about an indexing axis in said frame, a plurality of spindles revolubly carried at spaced locations on said spindle carrier, collet means carried by each spindle and including a rearwardly extending actuating tube, opposed frusto-conical spring washers intermediate the front of said spindle and the rear of said tube and loading said collet means via said tube and in the direction to set said collet means in a stock-gripping position, means including a thrust bearing slidably carried by said spindle to relieve said spring washers, a separate thrust yoke embracing each spindle and having thrust projections aligned with part of said bearing at substantially diametrically opposed locations with respect to the spindle axis and substantially equally radially spaced with respect to the indexing axis, separate radially inward fulcrum means on each said yoke, said spindle carrier including central fulcrum abutment means for the fulcrum means of all said yokes, an exposed externally accessible actuating surface on each said yoke at a radially outward location with respect to the indexing axis and with respect to the particular spindle axis, whereby for fluctuations in stock size from stock in one collet to stock in another collet the yoke actuating surfaces of different spindle collets will assume different positions that are variously axially displaced from a radial plane about the index axis, and a frame-based force-multiplying linkage mounted at one of the index positions of said spindle carrier and comprising a lever pivoted on said frame and including actuator means to engage successive of said actuating surfaces as said spindle is indexed to successive stations, said actuator means and each of said actuating surfaces having cooperating cam and cam-follower means engageable as each particular spindle is indexed into the chucking station, said cam and cam-follower means being oriented for axial action, whereby said cam and cam-follower means may engage for a variety of stock sizes within such size fluctuations, and further whereby the limited axial displacement available for chuck opening by reason of a large force-multiplying factor in said linkage may not be adverse to the accomplishment of effective collet opening for any such stock-size fluctuations, and in which there are separate spring-relieving thrust bearings on opposite longitudinal sides of said spring washers, in which two thrust yokes embrace each spindle on opposite longitudinal sides of said thrust bearings, and in which said frame-based force-multiplying linkage is of the differential variety including longitudinally spaced thrust applicators posied to intercept corresponding pairs of projecting thrust surfaces on both said spaced yokes for successive indexed positions of said spindle carrier.

References Cited in the file of this patent

UNITED STATES PATENTS

| | | |
|---|---|---|
| 210,165 | Stockwell | Nov. 19, 1878 |
| 463,626 | Hastings | Nov. 24, 1891 |
| 1,650,374 | Mero | Nov. 22, 1927 |
| 2,033,490 | Simpson | Mar. 10, 1936 |
| 2,252,840 | Drissner | Aug. 19, 1941 |
| 2,397,561 | Petsche | Apr. 2, 1946 |